US012559198B2

(12) United States Patent
Haase et al.

(10) Patent No.: US 12,559,198 B2
(45) Date of Patent: Feb. 24, 2026

(54) STATOR RING-INTERNAL GEAR ASSEMBLY FOR A TRANSMISSION DEVICE OF A WHEEL HUB DRIVE COMPRISING A PLANETARY GEAR, WHEEL HUB DRIVE HAVING SUCH A STATOR RING-INTERNAL GEAR ASSEMBLY AND A VEHICLE OPERATED BY WHEEL HUB DRIVE AND MUSCLE POWER

(71) Applicant: MAHLE International GmbH, Stuttgart (DE)

(72) Inventors: Robin Haase, Reinhardtsdorf (DE); Matthias Koop, Neufahrn (DE); Jan Pruegner, Dresden (DE)

(73) Assignee: Mahle International GmbH (DE)

( * ) Notice: Subject to any disclaimer, the term of this patent is extended or adjusted under 35 U.S.C. 154(b) by 445 days.

(21) Appl. No.: 18/104,785

(22) Filed: Feb. 1, 2023

(65) Prior Publication Data

US 2023/0242209 A1 Aug. 3, 2023

(30) Foreign Application Priority Data

Feb. 2, 2022 (DE) ..................... 10 2022 201 081.7

(51) Int. Cl.
B62M 6/65 (2010.01)
B60B 27/00 (2006.01)
(Continued)

(52) U.S. Cl.
CPC ........... B62M 6/65 (2013.01); B60B 27/0047 (2013.01); B62M 11/02 (2013.01); F16H 55/06 (2013.01);
(Continued)

(58) Field of Classification Search
CPC ........ B62M 6/65; B62M 11/02; B62M 11/14; B62M 11/18; B62M 11/16; B62M 11/145;
(Continued)

(56) References Cited

U.S. PATENT DOCUMENTS 6,276,475 B1 * 8/2001 Nakanosono .......... B62M 11/16
310/67 R
8,449,421 B2 5/2013 Jung
(Continued)

FOREIGN PATENT DOCUMENTS

CN 2322888 Y 6/1999
DE 102016123047 A1 6/2017
(Continued)

OTHER PUBLICATIONS

English abstract for CN-2322888.
German Search Report for DE102022201081.7, dated Sep. 12, 2022.

*Primary Examiner* — Timothy Hannon
(74) *Attorney, Agent, or Firm* — Fishman Stewart PLLC

(57) ABSTRACT

A stator ring-internal gear assembly for a transmission device comprising a planetary gear of a wheel hub drive for a vehicle, the assembly may include a stator ring of an electrically operable electric motor device of the wheel hub drive for providing a motor torque and an internal gear of the transmission device for translating the provided motor torque into a net torque. The stator ring and the internal gear may be directly fixed to one another by positive connection in a non-rotatable and tension-resistant manner. The stator ring and the internal gear may form a mono-lithic unit.

19 Claims, 10 Drawing Sheets

(51) Int. Cl.
    *B62M 11/02*         (2006.01)
    *F16H 55/06*         (2006.01)
    *H02K 7/116*         (2006.01)
    *F16H 55/17*         (2006.01)

(52) U.S. Cl.
    CPC ........ *H02K 7/116* (2013.01); *F16H 2055/065* (2013.01); *F16H 2055/176* (2013.01)

(58) Field of Classification Search
    CPC ... B60B 27/0047; B60B 27/023; H02K 7/116; H02K 1/185; F16H 55/06; F16H 2055/065; F16H 2055/176
    See application file for complete search history.

(56)             References Cited

U.S. PATENT DOCUMENTS

| | | | |
|---|---|---|---|
| 8,657,047 B2 * | 2/2014 | Urabe | B60L 7/14 |
| | | | 301/6.5 |
| 9,308,965 B2 | 4/2016 | Franz-Xaver | |
| 9,525,320 B2 * | 12/2016 | Vuolle-Apiala | F03D 80/70 |
| 10,131,402 B2 * | 11/2018 | Hayslett | F16H 1/2818 |
| 2016/0332696 A1 * | 11/2016 | Spaggiari | H02K 7/116 |

FOREIGN PATENT DOCUMENTS

| | | | |
|---|---|---|---|
| EP | 2351943 A1 | 8/2011 |
| EP | 2562072 A1 | 2/2013 |
| EP | 3216686 A1 | 9/2017 |

* cited by examiner 42a, 42, 40, 35

74

37, 66

67

35, 40, 42, 42a 37, 66

74

75   118

67

35, 40, 42, 42a 35, 40, 42, 42a

STATOR RING-INTERNAL GEAR ASSEMBLY FOR A TRANSMISSION DEVICE OF A WHEEL HUB DRIVE COMPRISING A PLANETARY GEAR, WHEEL HUB DRIVE HAVING SUCH A STATOR RING-INTERNAL GEAR ASSEMBLY AND A VEHICLE OPERATED BY WHEEL HUB DRIVE AND MUSCLE POWER

CROSS-REFERENCE TO RELATED APPLICATIONS

This application claims priority to German Patent Application No. DE 10 2022 201 081.7, filed on Feb. 2, 2022, the contents of which is hereby incorporated by reference in its entirety.

TECHNICAL FIELD

The invention relates to a stator ring-internal gear assembly for a transmission device of a wheel hub drive comprising at least one planetary gear. The invention also relates in particular to a wheel hub drive having such stator ring-internal gear assembly and further, in particular, to a vehicle operated by wheel hub drive and muscle power.

BACKGROUND

A stator ring-internal gear assembly of this type is known from a wheel hub drive for an electric bicycle described in CN 2322888Y. Disadvantageous is that axially, with respect to the main driveshaft of the wheel hub drive, it is relatively large.

SUMMARY

The object of the invention therefore consists in providing an improved or at least another embodiment of a stator ring-internal gear assembly. In particular, a wheel hub drive having such a stator ring-internal gear assembly and further in particular a vehicle operated by wheel hub drive and muscle power is to be proposed.

With the present invention, this object is solved in particular through the subjects of the independent claim(s). Advantageous embodiments are the subject matter of the dependent claim(s) and of the description.

The basic idea of the invention consists in providing a stator ring-internal gear assembly for a wheel hub drive that is optimised by measures of the function integration with respect to weight, number of parts, installation space and production costs.

Accordingly, a stator ring-internal gear assembly for a transmission device of a wheel hub drive comprising at least one planetary gear for a vehicle, in particular an electric bicycle, is provided, which comprises a stator ring of an electrically operable electric motor device of the wheel hub drive for providing a motor torque and an internal gear of the transmission device for translating the provided motor torque into a net torque. It is substantial that the said stator ring and the said internal gear are directly fixed to one another in a non-rotatable and tension-resistant manner by way of a positive connection, or that the said stator ring and the said internal gear form a monolithic unit. In other words, the said stator ring and the said internal gear according to the one, first embodiment are directly or indirectly fixed to one another positively and without additional fixing means such as for example fastening screws, i.e. in particular free of fasteners and/or free of fastening screws. The positive connection can be realised by over-moulding the stator ring with material which, in the hardened state, forms the internal gear, which is why the said positive connection could by all means be also referred to as material-positive connection or primary mould positive connection. Because of this, the stator ring-internal gear assembly can be realised with a relatively low number of components and in particular in a compact manner. The stator ring-internal gear assembly is thus in particular relatively compact axially and light in weight. The said stator ring and the said internal gear according to the other, second embodiment is quasi-embodied in an integrally bonded manner, and thus forms a continuous unit. Because of this, a relatively compact and durable stator ring-internal gear assembly is likewise realised which can be advantageously used in a wheel hub drive.

The transmission device is practically equipped in order to translate a provided motor torque into a net torque, wherein it operates with a single, pre-set or pre-settable transmission ratio.

The said positive connection is practically realised in that the said internal gear, as part of a casting method, in particular of an injection moulding method, is joined to the stator ring by over-moulding the same. Thus, the internal gear and the stator ring form a multi-part but integral permanently joined stator ring-internal gear assembly, which for example as part of a casting method or of a plastic injection moulding method can be provided cost-effectively and in large quantities.

Further practically it can be provided that the said internal gear is joined to a stator carrier portion of the stator ring situated radially outside, in particular joined at an edge region of the stator ring. Practically, the internal gear is exemplarily arranged on a stator carrier pot of the stator carrier, wherein it is positively fixed there in particular by means of over-moulding. Because of this, the internal gear is non-rotatably secured with respect to the stator ring as well as axially thereto, so that it cannot be axially removed from the stator ring.

Practically it can be provided that on a side facing the internal gear the stator ring has a circumferential edge toothing, which is over-moulded by the internal gear. The said edge toothing practically comprises teeth and gaps arranged between the teeth, which are completely enclosed by the moulded-on internal gear. The teeth are practically configured wedge-shaped and with respect to a centre axis of a hub housing of the wheel hub drive oriented radially to the outside. Because of this, a positive connection in the circumferential direction is realised between the stator ring and the internal gear. This has the advantage that a torque can be transmitted relatively efficiently from the stator ring to the internal gear or vice versa.

Further practically it can be provided that the said wheel toothing, in particular its teeth, have an undercut which is over-moulded by the internal gear. Because of this, an efficient axial positive connection can be realised so that the stator ring is axially secured against being unintentionally removed.

Practically it can be provided that the internal gear is equipped in order to interact with at least two planetary gears of the transmission device in that it completely engages over these axially. The internal gear can be equipped with an internal toothing, in particular an internal helical toothing running with low noise during the operation in order to interact with the at least two planetary gears of the transmission device.

It can be provided, furthermore, that the stator ring comprises a stator and a stator carrier receiving the same. The stator carrier can be configured in multiple parts and comprise a pot-shaped stator carrier pot and a stator carrier cover. Alternatively, the stator carrier can be realised by a cylinder ring body to the internal lateral surface of which oriented radially to the inside the stator is joined, wherein the internal gear is optionally secured axially by a locking ring. Different embodiments for a stator ring are thus stated. In particular, the stator carrier realised by a cylinder ring body can, because of its simple geometry, be produced cost-effectively and in large quantities so that it is advantageous in particular for a series production of the stator ring-internal gear assembly.

Further practically, it can be provided that the stator carrier of the stator ring or its pot-shaped stator carrier pot and/or its stator carrier cover and/or its cylinder ring body are produced from a metal material, in particular from an aluminium material or a steel material, a plastic material or a composite material. Practically, the internal gear can be produced from a plastic material or a composite material. Because of this, a stator ring-internal gear assembly that is relatively durable mechanically and because of the use of plastic or composite material, also relatively light in weight can be provided.

According to a further basic idea of the invention, which can be realised additionally or alternatively to the basic idea mentioned further up, a wheel hub drive of a vehicle, in particular an electric bicycle, is proposed, which has a hub housing assembled from a cup-shaped, monolithic housing pot and a monolithic housing cover, which hub housing is rotatably adjustably mounted on a central hollow shaft of the wheel hub drive that is arranged coaxially with respect to a centre axis of the wheel hub drive, a drive unit consisting of an electrically operated electric motor device housed in the hub housing for providing a motor torque, a transmission device housed in the hub housing for translating the motor torque into a net torque and a coupling device housed in the hub housing for transmitting the net torque to the housing cover. The drive unit can be practically equipped with at least one stator ring-internal gear assembly assigned in particular to the electric motor device and to the transmission device according to the preceding claims. Because of this, the said wheel hub drive is a relatively compact construction, realised light in weight and can be provided relatively cost-effectively.

Furthermore, it can be provided that the electric motor device, the transmission device and the coupling device are arranged coaxially with respect to the centre axis. The electric motor device, the transmission device and the coupling device are arranged axially in series with respect to the centre axis. Because of the proposed arrangement, the wheel hub drive can be realised to be relatively compact.

According to a further basic idea of the invention, which can be realised additionally or alternatively to the basic idea mentioned further up, a vehicle operated by wheel hub drive and muscle power, in particular an electric bicycle, is proposed, which has at least one wheel hub drive installed in the region of a wheel hub of a wheel of the vehicle according to the above description and a muscle power-operated pedal device interacting via a transmission gear, in particular a chain drive, with the wheel hub drive. Because of this, a vehicle, in particular an electric bicycle, having a wheel hub drive and a pedal device is stated, wherein the said wheel of the vehicle is constructed axially in a relatively compact manner and light in weight because of the improvements of the wheel hub drive discussed above.

In summary it remains to note: the present invention practically relates to a stator ring-internal gear assembly for a transmission device of a wheel hub drive comprising at least one planetary gear for a vehicle, in particular an electric bicycle. Practically, it comprises a stator ring of an electrically operable electric motor device of the wheel hub drive for providing a motor torque and an internal gear of the transmission device for translating the provided motor torque into a net torque. Practically it is substantial that the said stator ring and the said internal gear are directly fixed to one another by positive connection in a non-rotatable and tension-resistant manner or that the said stator ring and the said internal gear form a monolithic unit.

Further important features and advantages of the invention are obtained from the subclaims, from the drawings and from the associated figure description by way of the drawings.

It is to be understood that the features mentioned above and still to be explained in the following cannot only be used in the respective combination stated, but also in other combinations or by themselves without leaving the scope of the present invention.

Preferred embodiments of the invention are shown in the drawings and are explained in more detail in the following description, wherein same reference numbers related to same or similar or functionally same components.

BRIEF DESCRIPTION OF THE DRAWINGS

It shows, in each case schematically

DETAILED DESCRIPTION

Figure 1:
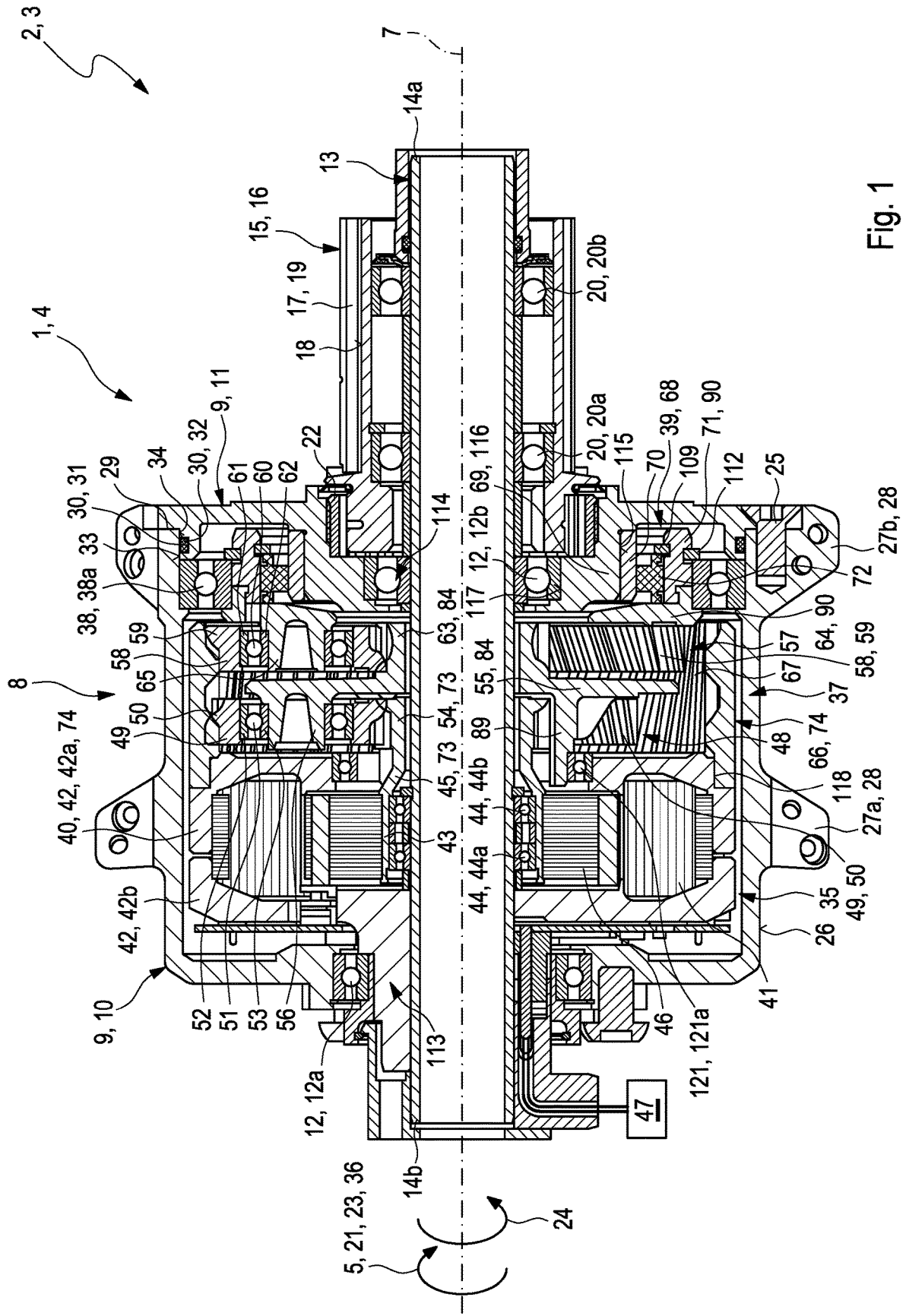
FIG. 1 shows a longitudinal section of a wheel hub drive 1 according to a first embodiment.

FIGS. 1 to 17 show preferred embodiments of a wheel hub drive designated in its entirety by the reference number 1 for a vehicle exemplarily realised by an electric bicycle 3, which is installed for example in the region of a wheel hub 4 of a wheel 2 of the electric bicycle 3 or forms the same and can practically transmit a drive torque 5 to the wheel 2.

FIG. 1 illustrates a longitudinal section through the said wheel hub drive 1 according to a first embodiment, wherein except for rolling bodies of rolling bearings not designated in more detail all components are cut open along a centre axis 7 drawn-in dotted line, so that on the one hand internal torque paths and the design configuration of the components of the wheel hub drive 1 located inside, which are explained in more detail in the following, are visible.

The wheel hub drive 1 comprises a multi-part hub housing 9 housing a drive unit 8 consisting of a pot-shaped mono-lithic housing pot 10 and a monolithic housing cover 11. The hub housing 9 is rotatably adjustably mounted about the centre axis 7 by way of a first rolling bearing arrangement 12 consisting of two separate rolling bearings 12a, 12b, in particular two commercially available simple ball rolling bearings, in a fixed-floating bearing arrangement directly or indirectly on a central hollow shaft 13 of the wheel hub drive 1 arranged coaxially with respect to the centre axis 7, which can be realised for example by an aluminium or steel hollow shaft. Here, the central hollow shaft 13 penetrates the housing part 10 and the housing cover 11 of the hub housing 9 centrally in each case, practically in the region of a housing pot central opening 113 of the housing pot 10 provided for this purpose and a housing cover central opening 114 of the housing cover 11, as a result of which the central hollow shaft 13 protrudes over the hub housing 9 on both sides axially with respect to the centre axis 7 with free axial ends 14a, 14b. The one free axial end 14a can be configured with respect to the centre axis 7 longer than or as long as the other free axial end 14b. The central hollow shaft 13 continues to be exemplarily fixed in the region of its two free axial ends 14a, 14b to a frame of the electric vehicle 3 which is not illustrated.

In FIG. 1 it is noticeable, furthermore, that the housing cover 11, forming an annular contact region 29 rotating about the centre axis 7 is supported on the housing pot 10. Practically, a seal arrangement 30 with a circumferential groove 31 introduced into the housing cover 11 and/or housing pot 10 including a sealing element 32 arranged therein is provided in the contact region 29 between the housing cover 11 and the housing pot 10, so that herein the housing cover 11 is arranged on the housing pot 10 in a fluid-tight manner. Practically, the sealing arrangement 30 is designed as radial seal and for this purpose arranged between an annular housing cover radial bearing surface 33 oriented with respect to the centre axis 7 radially to the outside and a likewise annular housing bottom radial bearing surface 34 which in this regard is located radially opposite and oriented with respect to the centre axis 7 radially to the inside. Further sealing concepts can likewise be provided, for example an axial seal arranged in the contact region 29. Because of this, the drive unit 8 mentioned in the introduction can be housed by the hub housing 9 in a fluid-tight, in particular hermetically sealed manner, as a result of which a certain water tightness can be provided for the wheel hub drive 1 proposed according to the invention, as a result of which the wheel hub drive 1 can also be used without problems in bad weather situations.

Furthermore, the wheel hub drive 1 has a profile hollow shaft 15, which is exemplarily realised by a splined hollow shaft 16 with spline profile 17, which is equipped with spline profile drivers 19 arranged on its profile hollow shaft circumference lateral surface 18 arranged with respect to the centre axis 7 radially outside for establishing a positive shaft-hub connection, in particular with a commercially available sprocket set. Alternatively, the profile hollow shaft 15 can also be realised by a toothed hollow shaft that is not illustrated, which can also be referred to as sprocket hollow shaft, with straight or helically toothed shaft profile with teeth arranged on its circumferential lateral surface arranged with respect to the centre axis 7 radially outside. In FIG. 1 it is visible, furthermore, that the profile hollow shaft 15 is mounted rotatably adjustably about the centre axis 7 via a second rolling bearing arrangement 20 consisting of two separate rolling bearings 20a, 20b, in particular two commercially available, simple ball rolling bearings, in a fixed-floating bearing arrangement on the central hollow shaft 13, in particular in the region of its free axial ends 14a, 14b or on the same. Thus it is possible that a commercially available sprocket set that is not illustrated here can be mounted for the electric bicycle 3 consisting of sprocket wheels of different diameter with a profiling that is complementary with respect to the said spline profile 17 or toothed shaft profile on the profile hollow shaft 15, in order to be thus able to transmit a pedal torque 21 provided in particular by muscle power on a pedal device that is not illustrated to the profile hollow shaft 15 by way of a pedal-operated trans-mission gear, in particular a chain drive, to the profile hollow shaft.

In FIG. 1 it is noticeable, furthermore, that the profile hollow shaft 15 at one end supports itself in the region of the housing cover 11 by way of a freewheel 22 which is not further discussed with respect to its constructional configu-ration, in particular a commercially available pawl free-wheel screwed into the housing cover 11, on the said housing cover 11, as a result of which the pedal torque 21 provided on the profile hollow shaft 15 can be transmitted in a circumferential direction 23 rotating about the centre axis 7 from the profile hollow shaft 15 to the housing cover 11, since the freewheel 22 then non-rotatably jams the profile hollow shaft 15 with the housing cover 11, but no moments can be transmitted in a counter-circumferential direction 24 oriented opposite with respect to the circumferential direc-tion 23, since the freewheel 22 then slips through in a low-friction manner and enables a relative rotary movement between the profile hollow shaft 15 and the housing cover 11. The pedal torque 21 transmitted to the housing cover 11 upon a corresponding rotary adjustment of the profile hollow shaft 15 is transmitted from the housing cover 11 to the housing pot 10, for the purpose of which the housing cover 11 can be non-rotatably fixed to the housing pot 10 by means of fastening screws 25. Finally, the pedal torque 21 is provided on the wheel 2 by way of two separate spoke-fastening rims 27a, 27b. The spoke-fastening rims 27a, 27b are exemplarily configured coaxially circumferentially with respect to the centre axis 7 and axially spaced apart from one another with respect to the centre axis 7 and formed by radial projections 28 integrally moulded onto an outer circumfer-ential surface 26 of the housing pot 10 for fastening indi-vidual spokes of the wheel 2.

Making further reference to FIG. 1 it must be explained that the drive unit 8 comprises an electrically operable electric motor device 35 for providing a motor torque 36, a transmission device 37 for translating the provided motor torque 36 into a net torque and a coupling device 39 for transmitting the net torque to the housing cover 11. Because of this, the motor torque 36 provided by the electric motor device 35 can be transmitted, converted according to a pre-set transmission ratio, to the housing cover 11 and, analogously to the pedal torque 21 explained above, be transmitted from the housing cover 11 to the housing pot 10, where it ultimately is made available on the wheel 2 as drive torque 5 via the two spoke-fastening rims 27a, 27b. The electric motor device 35, the transmission device 37 and the coupling device 39 are practically arranged coaxially with respect to the centre axis 7 and/or axially in series with respect to the centre axis 7.

According to FIG. 1, the electric motor device 35 has a stator ring 40 completely enclosing the central hollow shaft 13 in the circumferential direction 23 and configured in particular in multiple parts located with respect to the centre axis 7 radially outside, and a rotor ring 43 located with respect to the stator ring 40 radially inside and likewise enclosing the central hollow shaft 13 in the circumferential direction 23, which rotor ring 43 is rotatably adjustable with respect to the stator ring 40 and the central hollow shaft 13 about the centre axis 7. The rotor ring 43 exemplarily comprises a drive hollow shaft 45 rotatably adjustably mounted on the central hollow shaft 13 via a third rolling bearing arrangement 44 consisting of two separate rolling bearings 44a, 44b, in particular two commercially available simple ball rolling bearings, which drive hollow shaft 45 completely encloses the central hollow shaft 13 likewise in the circumferential direction 23. On the drive hollow shaft 45, a laminated core 46 of the rotor ring 43 with electrically shorted short-circuit bars is non-rotatably mounted. Exemplarily, the stator ring 40 comprises a stator 41 and a stator carrier 42 receiving the stator 41 that is non-rotatably arranged on the central hollow shafts 13. Practically, the latter can be configured in multiple parts and/or be divided into a stator carrier pot 42a and a stator carrier cover 42b and/or be realised by a metallic stator carrier, in particular an aluminium or steel stator carrier. The electric motor device 35 can be supplied with electric energy by means of an electric connection cable 47 that is only indicated symbolically.

In FIG. 1 it is visible, furthermore, that the said transmission device 37 is arranged with respect to the centre axis 7 directly axially adjacent to the electric motor device 35 and is formed by two separate planetary gears 48, 57, which with respect to the centre axis 7 are arranged in series. Because of this, the one planetary gear 48 of these two planetary gears 48, 57 directly faces the electric motor device 35 and is therefore referred to as first planetary gear 48 in the following, while the other planetary gear 57 of these two planetary gears 48, 57 is referred to as second planetary gear 57. Both the first planetary gear 48 and also the second planetary gear 57 exemplarily comprise three or more planet gear wheels 49, 58 each, which orbit in a joint internal gear 66 of the transmission device 37 which with respect to the centre axis 7 axially engage over completely and with respect to the centre axis 7 are located radially outside, wherein they each mesh with their external toothings 50, 59 with an internal toothing 67 of the internal gear 66, in particular an internal helical toothing. The internal gear 66 is thus a hollow-cylindrical internal gear which is jointly utilised by the planetary gears 48, 57 of the transmission device 37. The internal gear 66 can be preferably produced from an injection-mouldable plastic material or an injection-mouldable composite material.

Figure 3:
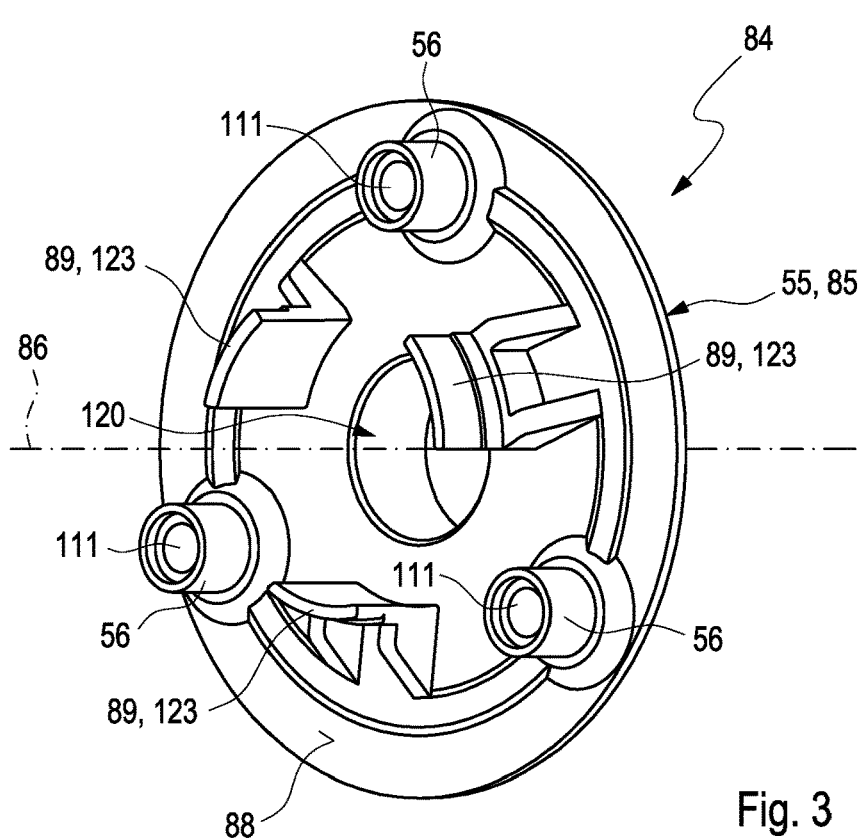
FIG. 3 shows, in a perspective view, the carrier ring sun gear assembly from FIGS. 1 and 2.

The three or more planetary gear wheels 49 of the first planetary gear 48 further mesh with their external toothings 50 with a sun gear 54 of the first planetary gear 48 located centrically with respect to the centre axis 7 and located radially inside with respect to these three or more planet gear wheels 49. This sun gear 54 is mechanically assigned to the drive hollow shaft 45 of the electric motor device 35 so that this sun gear 54 and the drive hollow shaft 45 interacts in a torque-transmitting manner. The three or more planet gear wheels 49 of the first planetary gear 48 are each equipped with a centric planet gear rolling bearing 51, wherein the respective outer rings 52 of these planet gear rolling bearings 51 are non-rotatably attached to the respective planet gear wheels 49 and the respective inner rings 53 of these planet gear rolling bearings 51 are arranged on support pins 56 of a planet carrier ring 55 of the first planet gear 48 equipped for supporting and guiding planet gear wheels. The inner rings 53 of these planet gear rolling bearings 51 are exemplarily connected to the respective support pins 56 of the planet carrier ring 55 by hot-staking, so that they are captively secured thereon. In FIG. 3 it is also visible that each support pin 56 for saving material and weight can have a cup-like axial recess 111.

The three or more planet gear wheels 58 of the second planetary gear 57 further mesh with their respective external toothings 59 with a sun gear 63 of the second planetary gear 57 located radially inside which is arranged centrically with respect to the centre axis 7 and the said three or more planet gear wheels 58. The three or more planet gear wheels 58 of the second planet gear 57 are each likewise equipped with a centrically arranged planet gear rolling bearing 60, analogously to the first planet gear 48. The respective outer rings 61 of these planet gear rolling bearings 60 are non-rotatably attached to the respective planet gear wheels 58 and the respective inner rings 62 are arranged on support pins 65 of a planet carrier ring 64 of the second planetary gear 57 equipped for supporting and guiding planet gear wheels. These inner rings 62 are also exemplarily secured to the respective support pins 65 by hot-staking, so that they cannot be unintentionally disconnected. The planet carrier ring 64 of the second planetary gear 57 can be practically supported with respect to the centre axis 7 on the housing pot 10 radially from the inside via a fourth rolling bearing arrangement 38, in particular a ball rolling bearing 38a. The sun gear 63 of the second planetary gear 57 is mechanically assigned to the planet carrier ring 55 of the first planetary gear 48 so that the planet carrier ring 55 of the first planetary gear 48 and the sun gear 63 of the second planetary gear 57 can interact in a torque-transmitting manner. Practically, the two planetary gears 48, 57 are arranged coaxially with respect to the centre axis 7 and/or axially with respect to the centre axis 7 in series.

In FIG. 1 it is visible, furthermore, that the said coupling device 39 is realised for transmitting the net torque from the transmission device 37 to the housing cover 11, here by a freewheel device 68, as a result of which the net torque provided by the drive unit 8 can be transmitted to the housing cover 11 dependent on the direction of rotation. Concretely this means that the net torque provided on the freewheel device 68 on the output side by the transmission device 37 can be transmitted in the circumferential direction 23 rotating about the centre axis 7 from the freewheel device 68 to the housing cover 11 since the freewheel device 68 then non-rotatably jams the transmission device 37 with the housing cover 11, but in the counter-circumferential direction 24 oriented opposite with respect to the circumferential direction 23 no moments can be transmitted since the freewheel device 68 then practically slips through without friction.

Purely exemplarily, the freewheel device 68 is constructed out of a freewheel inner ring 70, in particular a metallic freewheel inner ring which is non-rotatably mounted on the housing cover 11 via a bearing ring 69 of the housing cover 11, further in particular an aluminium or steel freewheel inner ring, a freewheel outer ring 71, in particular a metallic freewheel outer ring, further in particular a steel freewheel outer ring, and a clamping ring device 72 arranged between the freewheel inner ring 70 and the freewheel outer ring 71 which, dependent on the direction of rotation jams or releases the freewheel inner ring 70 with/from the freewheel outer ring 71. Practically, the freewheel outer ring 71 of the freewheel device 68 is supported on the housing pot 10 via the fourth rolling bearing arrangement 38 with respect to the centre axis 7 from radially inside and further practically mechanically assigned to the planet carrier ring 64 of the second planetary gear 57 so that the freewheel outer ring 71 and the planet carrier ring 64 of the second planetary gear 57 can interact in a torque-transmitting manner. The said bearing ring 69 of the housing cover 11 is practically formed by a ring projection 116 arranged on the housing cover 11 projecting into the hub housing 9 surrounding the centre axis 7 about the housing cover central opening 114, which on an outer ring surface oriented with respect to the centre axis 7 radially to the outside forms a first bearing seat 115 for the freewheel inner ring 70. On an inner surface oriented with respect to the centre axis 7 radially to the inside, the ring projection 116 can have a second bearing seat 117 for the one rolling bearing 12_b_ of the first rolling bearing arrangement 12.

In order to be able to produce the wheel hub drive 1 relatively compact axially in the direction of the centre axis 7 and relatively light in weight and, for cost reasons, with a minimum number of components, the invention proposes multiple design measures which can be realised by themselves or together on a wheel hub drive 1. According to FIGS. 1 to 13, all these measures are practically realised so that a particularly compact and cost-effective embodiment of the wheel hub drive 1 that is light in weight is made available. However, the invention practically also includes embodiments of the wheel hub drive 1 which merely comprise one of these measures or multiple of these measures.

According to a first measure it is provided that the mechanical assignment of the sun gear 54 of the first planetary gear 48 to the drive hollow shaft 45 of the electric motor device 35 described above is constructionally solved in that the said sun gear 54 and the said drive hollow shaft 45 are realised as a monolithic unit, which in the following is referred to as sun gear-drive hollow shaft unit 73. In other words, the sun gear 54 of the first planetary gear 48 is embodied integrally with the drive hollow shaft 45 of the electric motor device 35. This results in a relatively compact and durable sun gear-drive hollow shaft unit 73, which additionally can merely be supported on the central hollow shaft 13 via the third rolling bearing arrangement 44, 44_a_, 44_b_, as a result of which an additional bearing for the sun gear 54 of the first planet gear 48 can be omitted. The sun gear-drive hollow shaft unit 73 can optionally be produced from a metal material, a plastic material or a composite material.

According to a second measure it is provided that the three or more planet gear wheels 49 of the first planetary gear 48 and the three or more planet gear wheels 58 of the second planetary gear 57 are realised as same parts. In other words, the planet gear wheels 49, 58 employed in the two planet gears 48, 57 are of identical design. Such common parts can generally be provided cost-effectively and in large quantities. Further it can be provided that the planet gear wheels 49, 58 used in the wheel hub drive 1 are produced out of a plastic material or a composite material or a metal material. This has the advantage that compared with a metallic variant of the planet gear wheels 49, 58, which can be likewise employed in the described wheel hub drive 1, are relatively light in weight. However it can also be provided that the planet gear wheels 49 of the first planetary gear 48 and the planet gear wheels 58 of the second planetary gear 57 are realised as non-common parts in the manner that the planet gear wheels 49 of the first planetary gear 48 differ from those of the second planetary gear 57 constructionally or vice versa.

According to a third measure it is provided that the mechanical assignment of the sun gear 63 of the second planetary gear 57 to the planet carrier ring 55 of the first planetary gear 48 described above is constructionally solved in that the said planet carrier ring 55 and the said sun gear 63 form a monolithic unit which in the following is referred to as planet carrier ring-sun gear assembly 84, see FIGS. 1 to 3. In other words, the sun gear 63 of the second planetary gear 57 is embodied integrally with the planet carrier ring 55 of the first planetary gear 48. This results in a relatively compact and durable planet carrier ring-sun gear assembly 84. Practically, the planet carrier ring-sun gear assembly 84 can be produced out of a plastic material or a composite material, as a result of which the planet carrier ring-sun gear assembly 84, compared with a metallic variant of the planet carrier ring-sun gear assembly 84, which can likewise be employed in the described wheel hub drive 1, is relatively light in weight.

According to a fourth measure it is provided that the mechanical assignment of the freewheel outer ring 71 of the freewheel device 68 to the planet carrier ring 64 of the second planetary gear 57 described above is constructionally solved in that the said planet carrier ring 64 is positively arranged on the said freewheel outer ring 71, in particular injection-moulded on. The said planet carrier ring 64 and the said freewheel outer ring 71 thus form a multi-part yet integral, permanently joined planet carrier ring freewheel unit 90, wherein the freewheel outer ring 71, as explained above, can be produced out of a metal material, in particular an aluminium or steel material, and the said planet carrier ring 64 out of a plastic material or a composite material. Furthermore it can be provided that the said planet carrier ring 64, instead on the said freewheel outer ring 71, is positively arranged, in particular injection moulded on to the freewheel inner ring 70 of the freewheel device 68, see FIG. 15. Basically it could also be provided that the said planet carrier ring 64 is positively arranged, in particular injection moulded onto the freewheel outer ring 71 and the freewheel inner ring 70.

Figure 8:
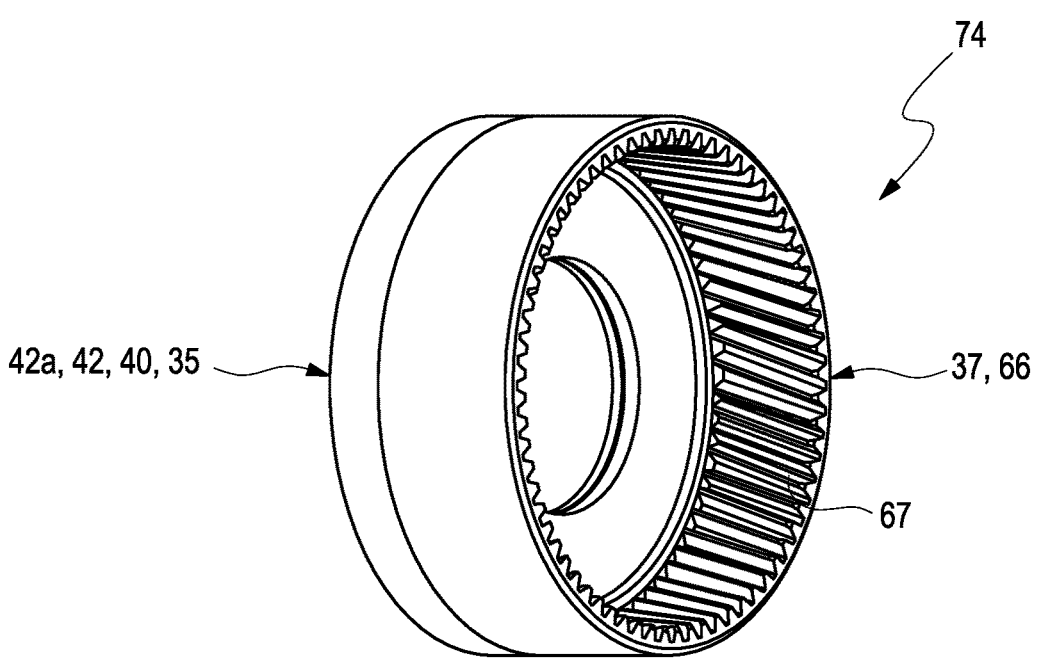
FIG. 8 shows, in a perspective view, a stator ring-internal gear assembly from FIG. 1 according to a preferred embodiment.
Figure 9:
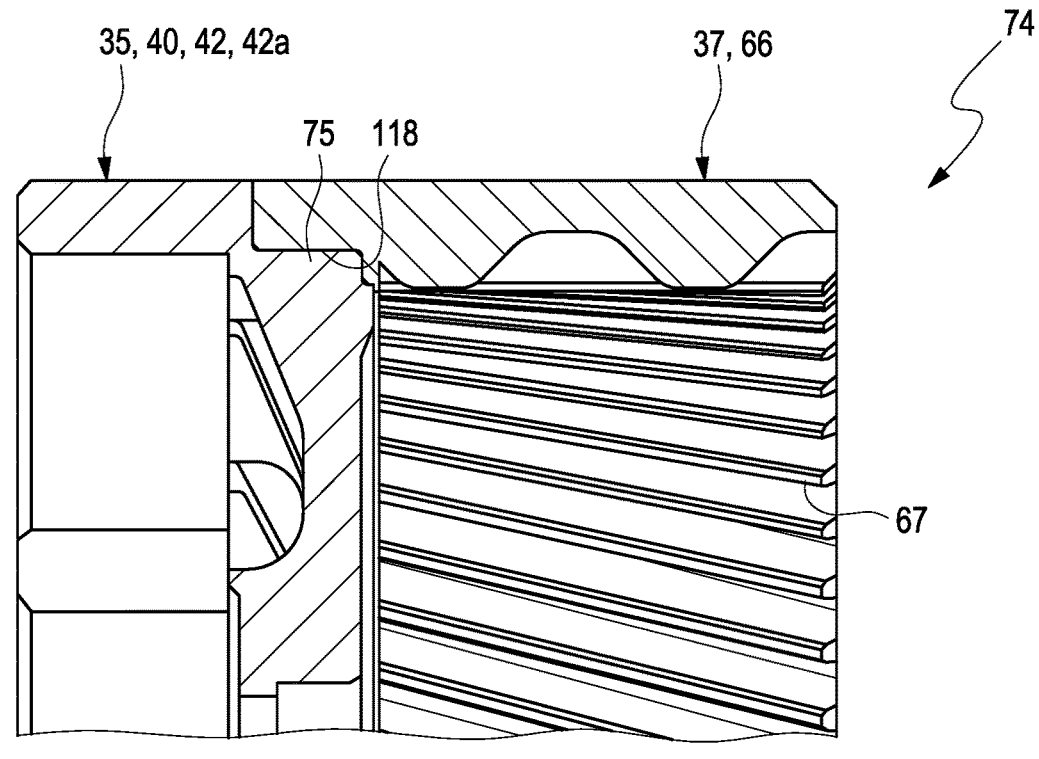
FIG. 9 shows a longitudinal section of the stator ring-internal gear assembly from FIG. 8.
Figure 10:
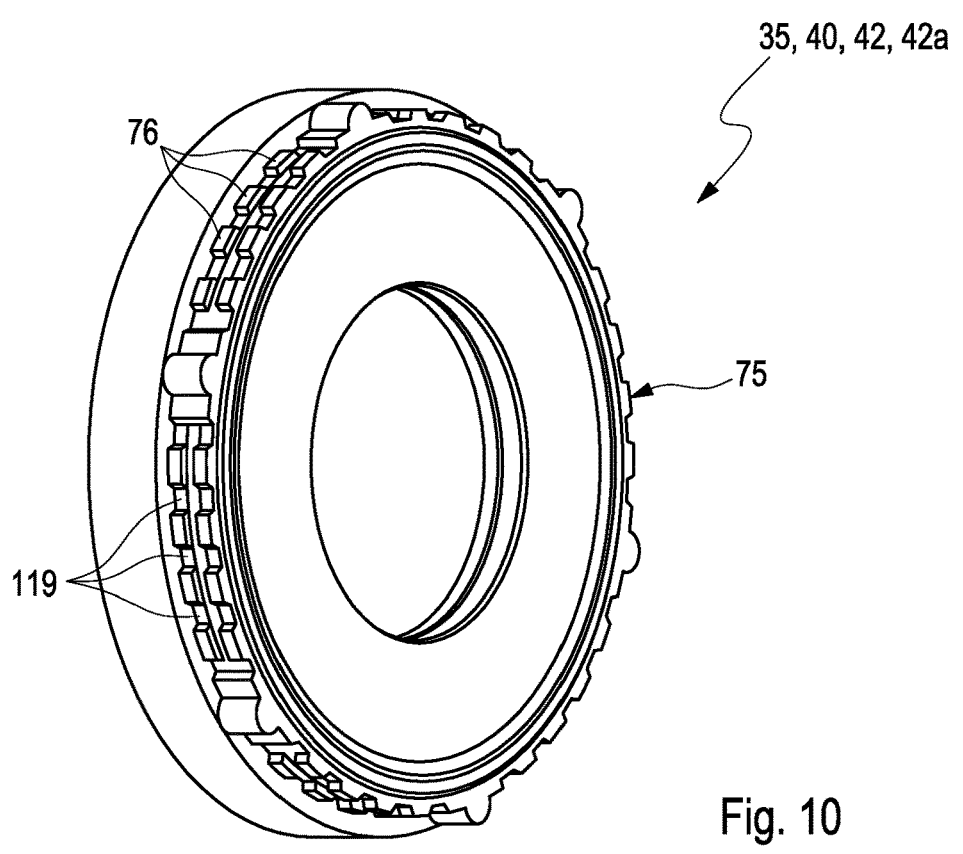
FIG. 10 shows, in a perspective view, a stator carrier of the electric motor device from FIG. 1 according to a preferred embodiment.
Figure 11:
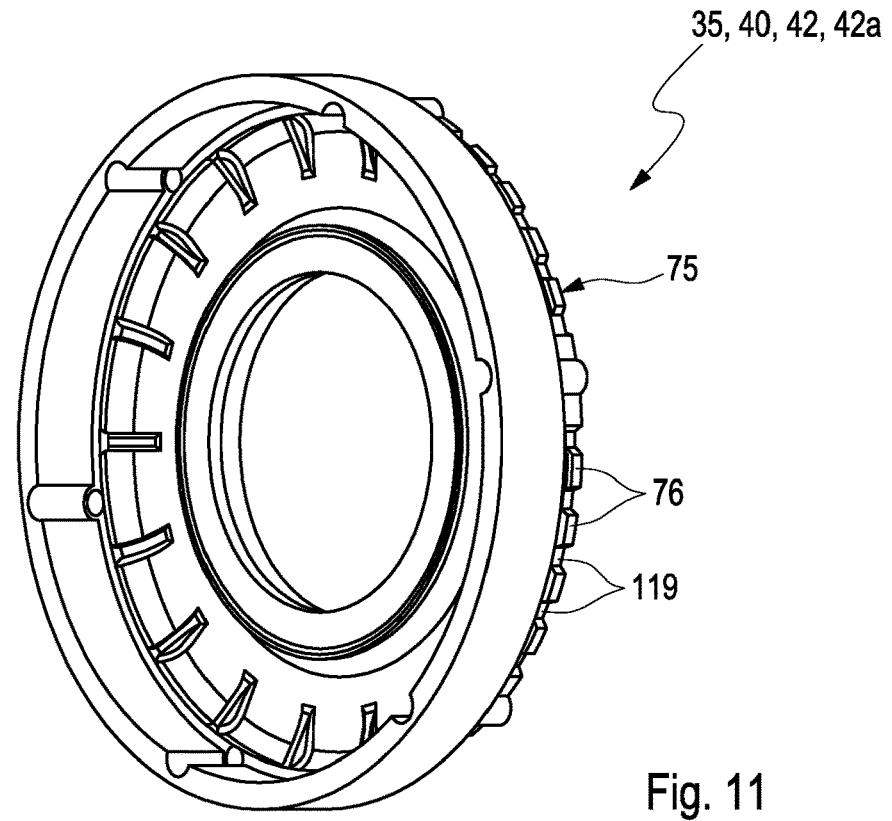
FIG. 11 shows, in a further perspective view, the stator carrier from FIG. 10.

According to a fifth measure it is provided that the internal gear 66 of the transmission device 37 described above is fixed on the stator ring 40 of the electric motor device 35, for example injection-moulded on, see FIGS. 8 and 9. In particular it can be provided that the said internal gear 66 is arranged on a stator carrier portion of the stator ring 40 located radially outside, in particular on an edge region 118 of the stator ring 40. In FIG. 1 as well as FIGS. 8 and 9 it is noticeable that the internal gear 66 is exemplarily arranged on the stator carrier pot 42_a_ of the stator carrier 42, it being fixed there in particular by means of injection moulding. Because of this, the internal gear 66 on the one hand is non-rotatably secured with respect to the stator ring 40 and the central hollow shaft 13 and also axially fixed with respect to the centre axis 7 on the stator ring 40, so that it cannot be axially removed from the stator ring 40. The said stator carrier 42 and the said internal gear 66 practically form a multi-part yet permanently joined stator ring-internal gear assembly 74.

In order to in particular improve the torque transmission between the internal gear 66 and the stator ring 40 it can be provided that the stator ring 40 or the stator carrier 42, on its side facing the first planetary gear 48, has a circumferential edge toothing 75, which is quasi-over-moulded by the internal gear 66. Practically, the edge toothing 75 is subsequently worked into the stator carrier 42 mechanically or formed by primary moulding and/or formed in particular by wedge-shaped teeth 76 which with respect to the centre axis 7 are oriented radially to the outside with an axial extent and gaps 119 between the teeth 76, see FIGS. 10 and 11. The edge toothing 75, in particular the teeth 76, can be formed with an undercut, which is likewise over-moulded by the internal gear 66, as a result of which it is even better secured axially on the stator carrier 42 against unintentional removal. Further practically, the stator carrier 42, as explained above, can be produced out of a metal material, in particular out of an aluminium or steel material, and the internal gear 66 out of a plastic material or a composite material.

Figure 12:
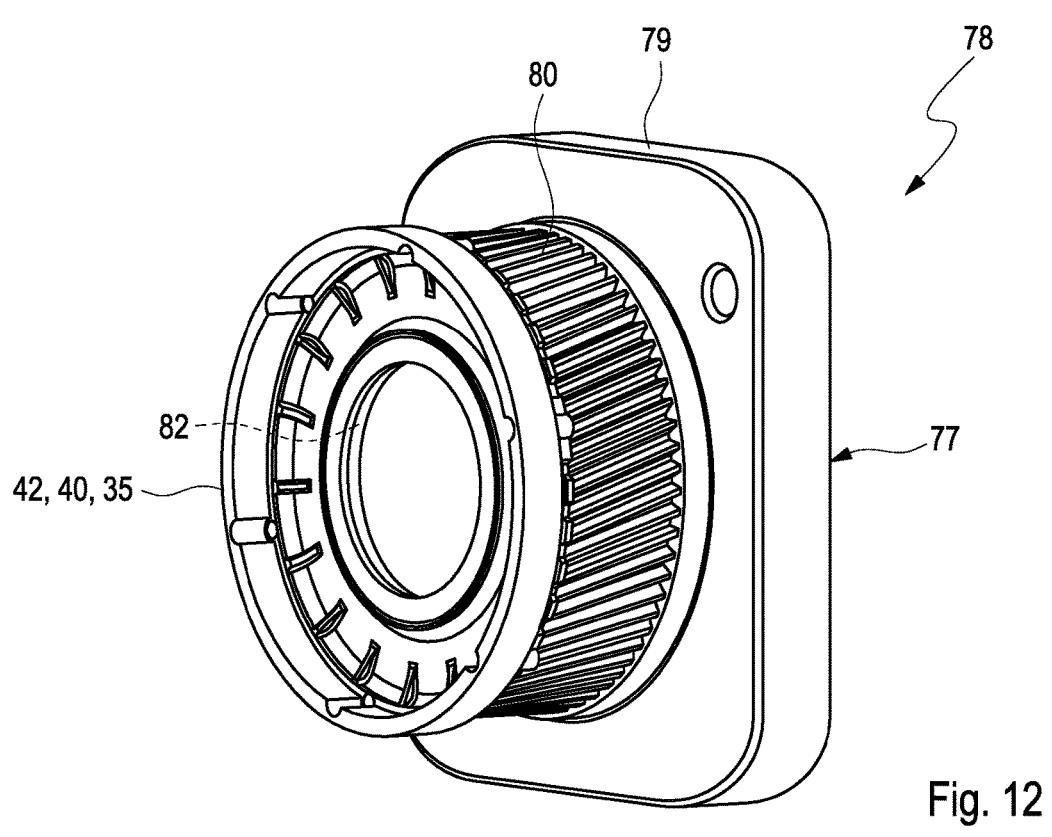
FIG. 12 shows, in a perspective view, an embodiment for a primary moulding tool for the production by plastic injection moulding of the stator ring-internal gear assembly from FIGS. 8 and 9.
Figure 13:
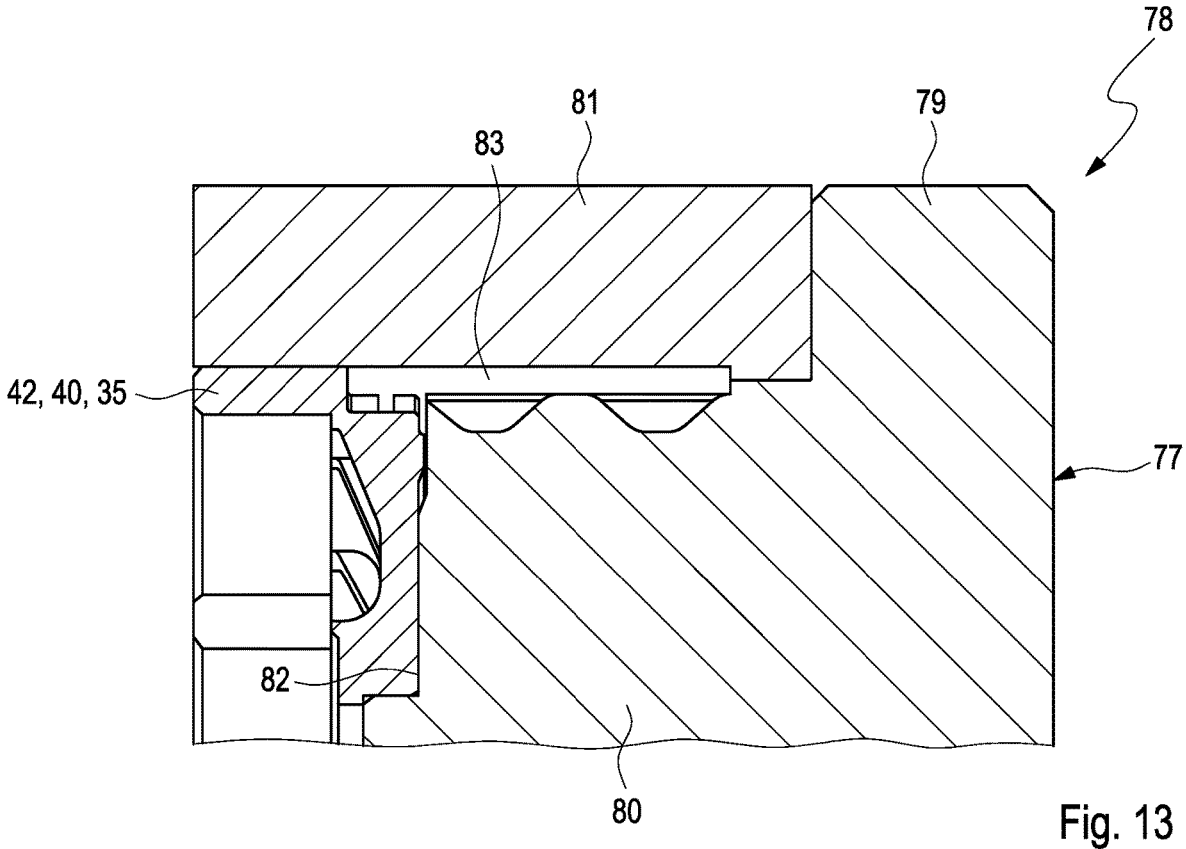
FIG. 13 shows a longitudinal section of the primary moulding tool from FIG. 12, FIGS. 14 through 17 each a further embodiment of the wheel hub drive 1 in a longitudinal section.

FIGS. 12 and 13 show an embodiment for a primary moulding tool 77 for producing the said internal gear 66 by way of plastic injection moulding and a plastic injection moulding method 78 for producing the internal gear 66. Within the scope of the plastic injection moulding method 78, the said primary moulding tool 77 is initially provided, which in particular comprises a negative primary mould 80 fixed to a holding base 79 for the internal toothing 67 of the internal gear 66 and a further negative primary mould 81 that can be plugged onto the holding base 79 for an outer contour of the internal gear 66. Following this, a prepared raw stator ring 40 or at least one prepared raw stator carrier 42 of the raw stator ring 40 is releasably fastened to an annular holding portion 82 on the negative primary mould 80 prepared for this purpose on the negative primary mould 80 and then the further negative primary mould 81 arranged on the holding base 79 on the negative primary mould 80 and the raw stator ring 40 or the raw stator carrier 42 so that between the negative primary mould 80, the further negative primary mould 81 and the stator ring 40 or the stator carrier 42 an annular cavity 83 defining the contour of the internal gear 66 is formed. The same can subsequently be completely filled with injection-mouldable plastic material by way of a feeder channel for plastic material arranged in the primary moulding tool 77 which is not illustrated here. Following the hardening of the injected material, the negative primary mould 80 and the further negative primary mould 81 can be removed as a result of which a multi-part yet permanently joined stator ring-internal gear assembly 74 out of a stator ring 40 or a stator carrier 42 and an internal gear 66 is made available.

Figure 2:
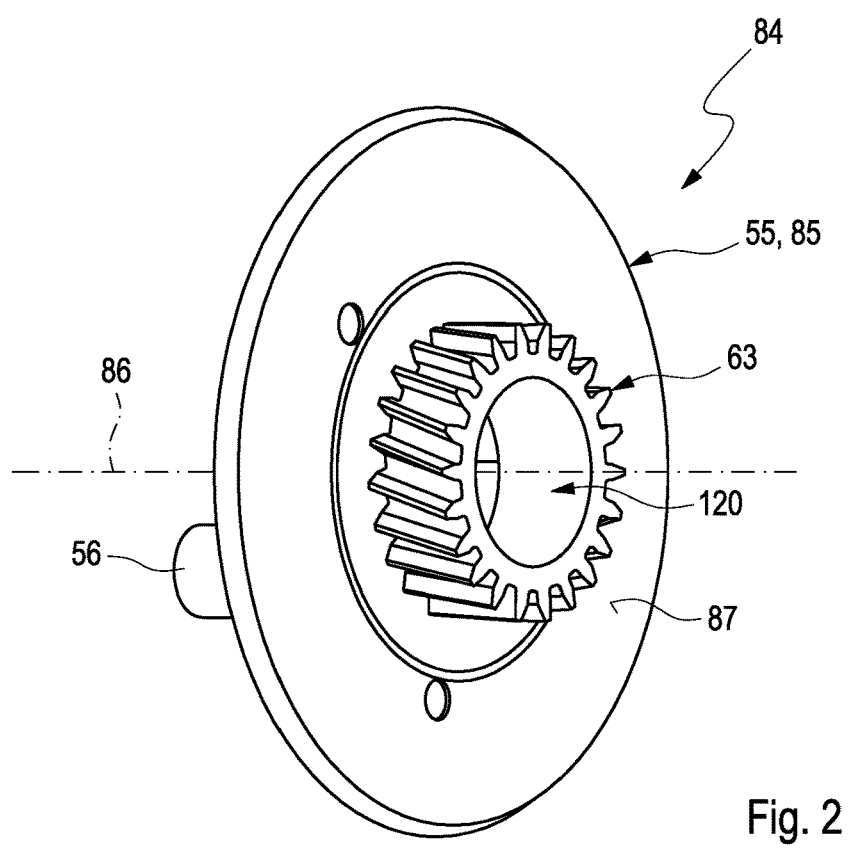
FIG. 2 shows, in a perspective view, a carrier ring sun gear assembly from FIG. 1 according to a preferred embodiment.

FIGS. 2 and 3 show the said planet carrier ring-sun gear assembly 84 of the wheel hub drive 1 from FIG. 1 each in a perspective view. In FIG. 2, the planet carrier ring-sun gear assembly 84 is illustrated with a view to its sun gear 63 and its planet carrier ring 55. The planet carrier ring 55 is exemplarily realised by a circular single-flange or single-walled basic ring disc body 85, which defines a planet carrier ring centre axis 86, which in the assembled state of the wheel hub drive 1 is oriented coaxially to the centre axis 7. The basic ring disc body 85 is configured symmetrically with respect to the planet carrier ring centre axis 86 and has a central opening 120 and two large annular surfaces which are oriented with respect to the planet carrier ring centre axis 86 offset from one another. The said sun gear 63 is now oriented coaxially to the planet carrier ring centre axis 86 and arranged on the front side on one of the two large annular surfaces of the basic ring disc body 85 referred to as sun gear mounting surface 87 in the following and integrally connected to the same. FIG. 3 shows the planet carrier ring-sun gear assembly 84, now viewing the large annular surface of the basic ring disc body 85 oriented opposite with respect to the sun gear mounting surface 87, which in the following is also referred to as planet carrier mounting surface 88. It is noticeable that the above mentioned support pins 56 of the planet carrier ring 55 for supporting the planet gear wheels 49 on the planet carrier mounting surface 88 are arranged evenly distributed located on a circular path about the planet carrier ring centre axis 86 and are integrally embodied with the basic ring disc body 85 of the planet carrier ring 55. The term "evenly" practically means that the support pins 56, in a circumferential direction not drawn in in FIGS. 2 and 3, round about the planet carrier ring centre axis 86, are each equidistant from one another. In FIG. 3 it is noticeable, furthermore, that the planet carrier ring-sun gear assembly 84 comprises three axial bearing arms 89 which are arranged on the planet carrier mounting surface 88 located evenly distributed on a circular path about the planet carrier ring centre axis 86 and are integrally moulded onto the basic ring disc body 85, like the said support pins 56. Here, the term "evenly" likewise means practically that the axial bearing arms 89 are each equidistant from one another in the said circumferential direction that is not drawn in about the planet carrier ring centre axis 86. The axial bearing arms 89 exemplarily stand perpendicularly on the planet carrier mounting surface 88 and/or are produced out of a plastic material or a composite material, like the basic ring disc body 85 and the support pins 56. The axial bearing arms 89 are each exemplarily formed by an annular segment body 123, which with their concave sides are oriented in the direction of the planet carrier centre axis 86. Further, the axial bearing arms 89 are each exemplarily arranged between two support pins 56 in particular so that in the said circumferential direction round about the planet carrier ring centre axis 86 which is not drawn in, support pins 56 and axial bearing arms 89 are alternatingly arranged. Between the support pins 56 and the axial bearing arms 89, an identical circumferential distance can always be arranged in the said circumferential direction, which is not drawn in, round about the planet carrier ring centre axis 86, as a result of which adjacent support pins 56 and axial bearing arms 89 are equidistant from one another. In the assembled state of the wheel hub drive 1, the axial bearing arms 89 of the planet carrier ring-sun gear assembly 84 are axially and/or radially supported on the stator ring 40 of the electric motor device 35, in particular on the stator carrier 42 of the stator ring 40, as a result of which an advantageous mounting of the planet carrier ring-sun gear assembly 84 on the stator ring 40 is stated. In particular, the axial bearing arms 89 can be mounted on the stator ring 40 via a fifth rolling bearing arrangement 121, which is exemplarily realised by a commercially available, simple ball rolling bearing 121*a*.

FIGS. 4 to 7 show the planet carrier ring freewheel unit 90 described above, which is assembled out of the freewheel outer ring 71 of the freewheel device 68 and out of the planet carrier ring 64 of the second planetary gear 57.

Figure 4:
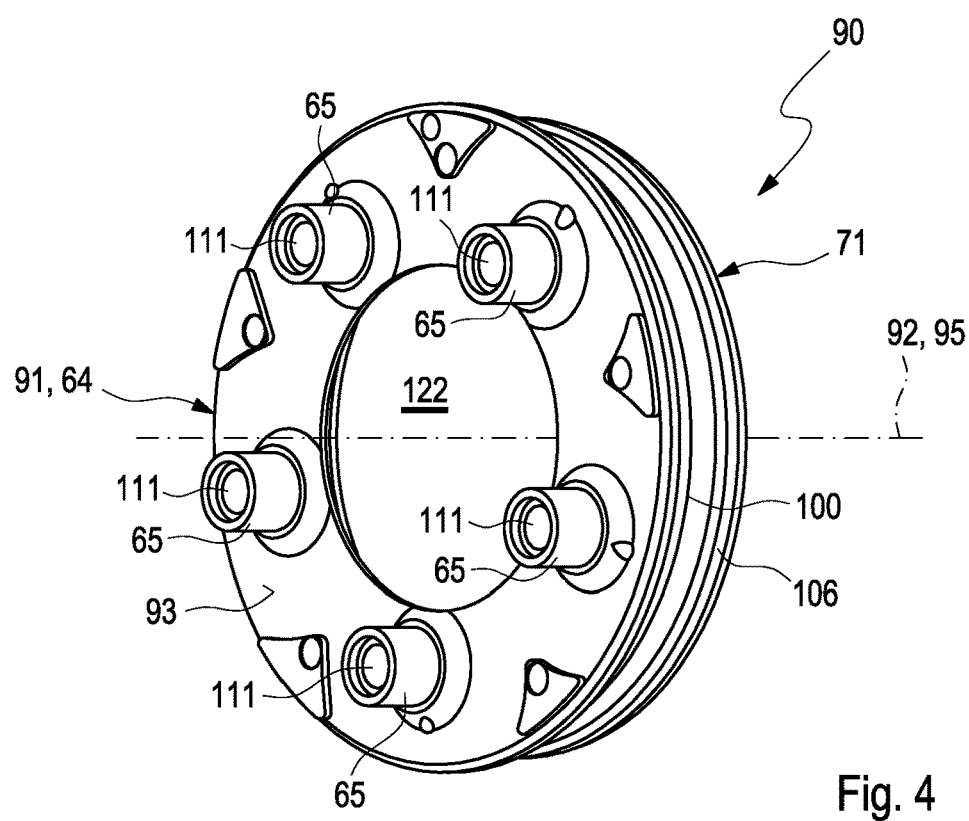
FIG. 4 shows, in a perspective view, a carrier ring freewheel assembly from FIG. 1 according to a preferred embodiment.

In FIG. 4, the planet carrier ring freewheel unit 90 is initially illustrated looking at the said planet carrier ring 64, the freewheel outer ring 71 is only noticeable in portions. The said planet carrier ring 64 is exemplarily realised by a circular, single-flange or single-walled basic ring disc body 91, which defines a planet carrier ring centre axis 92, which in the assembled state of the wheel hub drive 1 is arranged coaxially with the centre axis 7. The basic ring disc body 91 of the said planet carrier ring 64 is configured symmetrically with respect to the planet carrier ring centre axis 92 and has a central opening 122 and two large annular surfaces oriented with respect to the planet carrier ring centre axis 92 opposite one another, wherein the large annular surface visible in FIG. 4 is referred to as planet carrier mounting surface 93 in the following. It is noticeable that the support pins 65 of the said planet carrier ring 64 mentioned above are arranged located evenly distributed on a circular path about the planet carrier ring centre axis 92 at the planet carrier mounting surface 93 for supporting the planet gear wheels 58 of the second planetary gear 57 and are embodied integrally with the basic ring disc body 91 of the planet carrier ring 64. Here, the term "evenly" also practically means that the support pins 65 are each arranged equidistantly from one another in a circumferential direction about the planet carrier ring centre axis 92 which is not drawn in in FIGS. 4 and 5. Adjacent support pins 65 are thus equidistant from one another.

Figure 5:
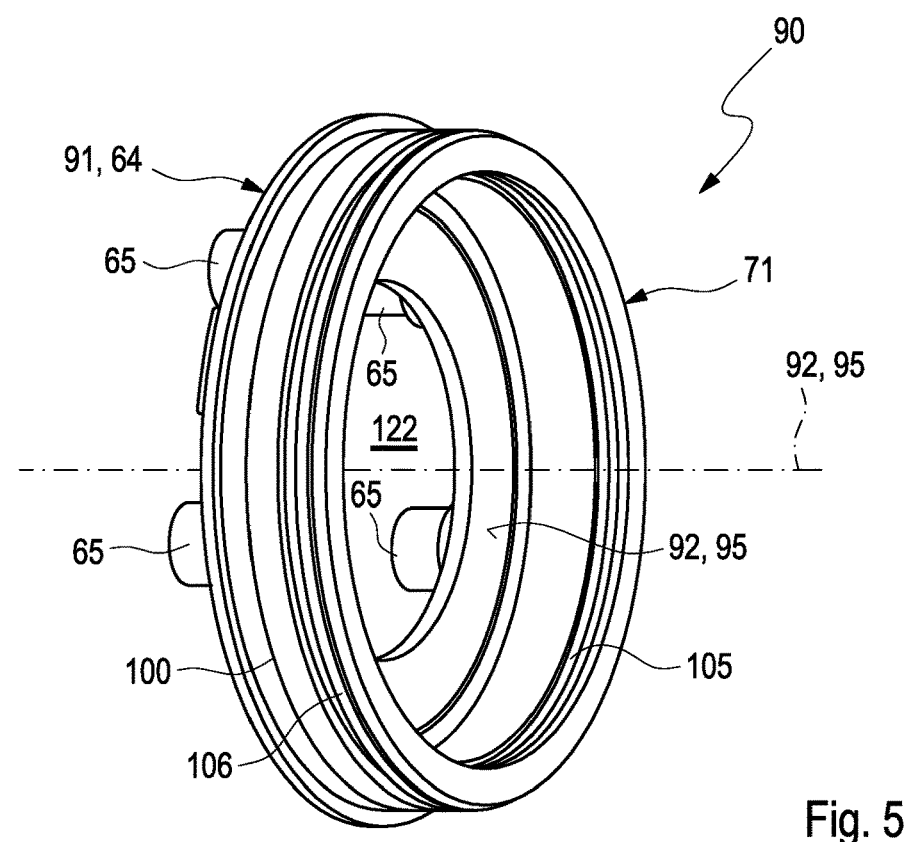
FIG. 5 shows, in a further perspective view, the carrier ring freewheel assembly from FIGS. 1 and 4.

In FIG. 5, the planet carrier ring freewheel unit 90 is illustrated looking at the said freewheel outer ring 71, instead the planet carrier ring 64 is now noticeable only in portions. The said freewheel outer ring 71 is exemplarily realised by a circular body which has a substantially rectangular cross-section and defines a freewheel outer ring centre axis 95, which in the assembled state of the wheel hub drive 1 coaxially coincides with the centre axis 7 and in the assembled state of the planet carrier ring freewheel unit 90 with the planet carrier ring centre axis 92. The freewheel outer ring 71, viewed with respect to the freewheel ring centre axis 95, has two axial end ring portions 96, 97 oriented opposite one another, which are integrally connected to one another by way of a central planet carrier ring portion 98 of the freewheel outer ring 71. With respect to the freewheel outer ring centre axis 95 the freewheel outer ring 71 is practically configured symmetrically.

In order to be able to permanently join the planet carrier ring 64 of the second planetary gear 57 to the freewheel outer ring 71 it is provided that the freewheel outer ring 71 is touchingly arranged with one of its two axial end ring portions 96 on the large annular surface of the basic ring disc body 91 of the planet carrier ring 64 oriented opposite with respect to the planet carrier mounting surface 93, which in the following is referred to as freewheel outer ring mounting surface 99 and is positively joined to the same in a positive connection region 100. Practically, the basic ring disc body 91 of the planet carrier ring 64 is injection-moulded onto this axial end ring portion 96 in the positive connection region 100. In order to be able to realise an optimal torque transmission between the planet carrier ring 64 and the freewheel outer ring 71, a toothing can be provided in the positive connection region 100 on the basic ring disc body 91 and/or the freewheel outer ring 71. According to FIGS. 6 and 7, such a toothing is exemplarily realised in the positive connection region 100 by a circumferential edge toothing 101 on the freewheel outer ring 71. The same can be subsequently worked in mechanically in an edge region of the axial end ring portions 64 facing the planet carrier ring 64 or be formed by primary moulding and/or be formed by in particular wedge-shaped teeth 102 and gaps 125 oriented with respect to the freewheel outer ring centre axis 95 radially to the outside. The planet carrier ring freewheel unit 90 can additionally have an undercut 103 in the said positive connection region 100 in order to realise an axial positive connection so that the freewheel outer ring 71 cannot be removed from the planet carrier ring 64 in the axial direction. For this purpose, it can be practically provided that the freewheel outer ring 71 in its axial end ring portion 96 facing the planet carrier ring 64 comprises in the positive connection region 100 a circumferential undercut-forming groove 104, wherein the basic ring disc body 91 of the planet carrier ring 64 is injection-moulded into or moulded on to this groove 104.

Figure 6:
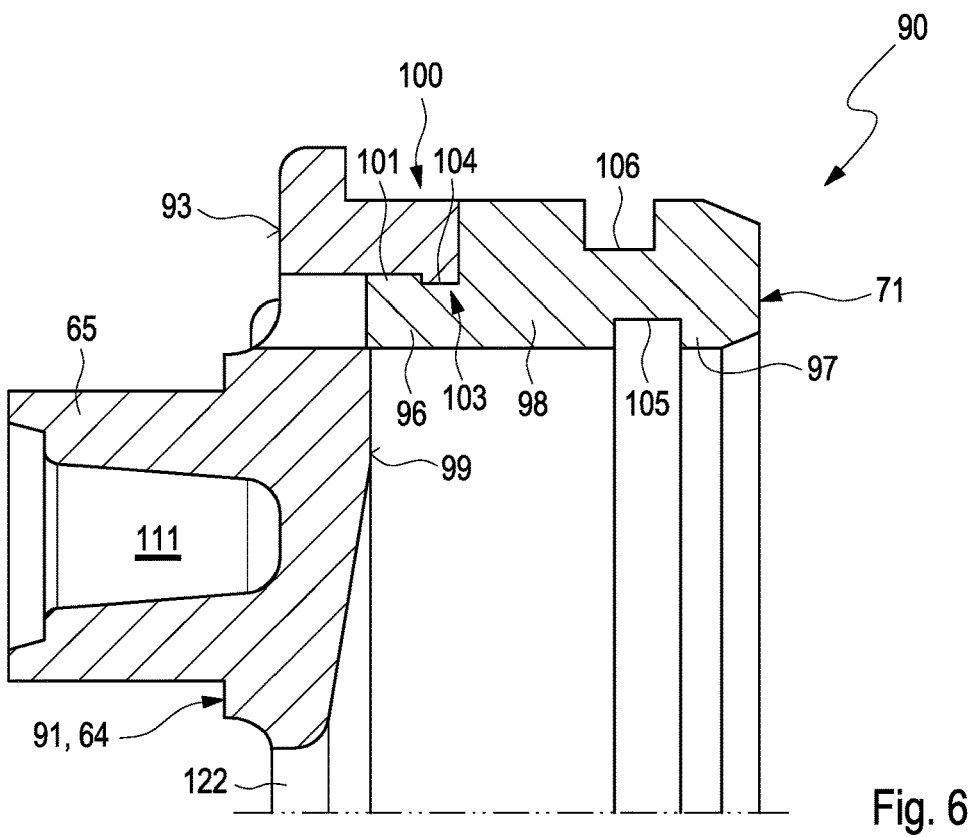
FIG. 6 shows a longitudinal section of the carrier ring freewheel assembly from FIGS. 1, 4 and 5.
Figure 7:
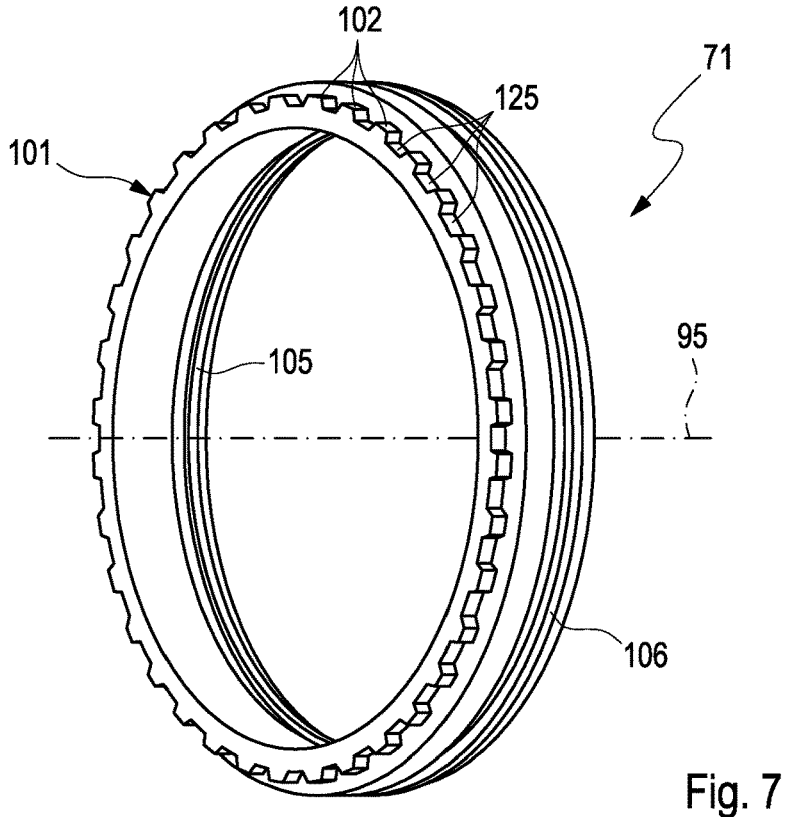
FIG. 7 shows, in a perspective view, a freewheel outer ring of the carrier ring freewheel assembly from FIGS. 1, 4 to 6 according to a preferred embodiment.

In particular in FIG. 6 it is evident that the planet carrier ring portion 98 of the freewheel outer ring 71 and/or the axial end ring portion 97 of the freewheel outer ring 71 not arranged in the positive connection region 100, i.e. that axial end ring portion 97 of the freewheel outer ring 71 which with respect to the axial end ring portion 96 arranged in the positive connection region 100 is oriented opposite, can comprise a circumferential locking ring inner groove 105 oriented with respect to the freewheel outer ring centre axis 95 radially to the inside for a first locking ring 109 for axially securing the freewheel device 68 and a circumferential locking ring outer groove 106 oriented with respect to the freewheel outer ring centre axis 95 radially to the outside for a second locking ring 112 for axially securing the fourth rolling bearing arrangement 38. In FIG. 6 it is also visible that each support pin 65, for saving material and weight, can comprise a cup-like axial recess 111.

Figure 14:
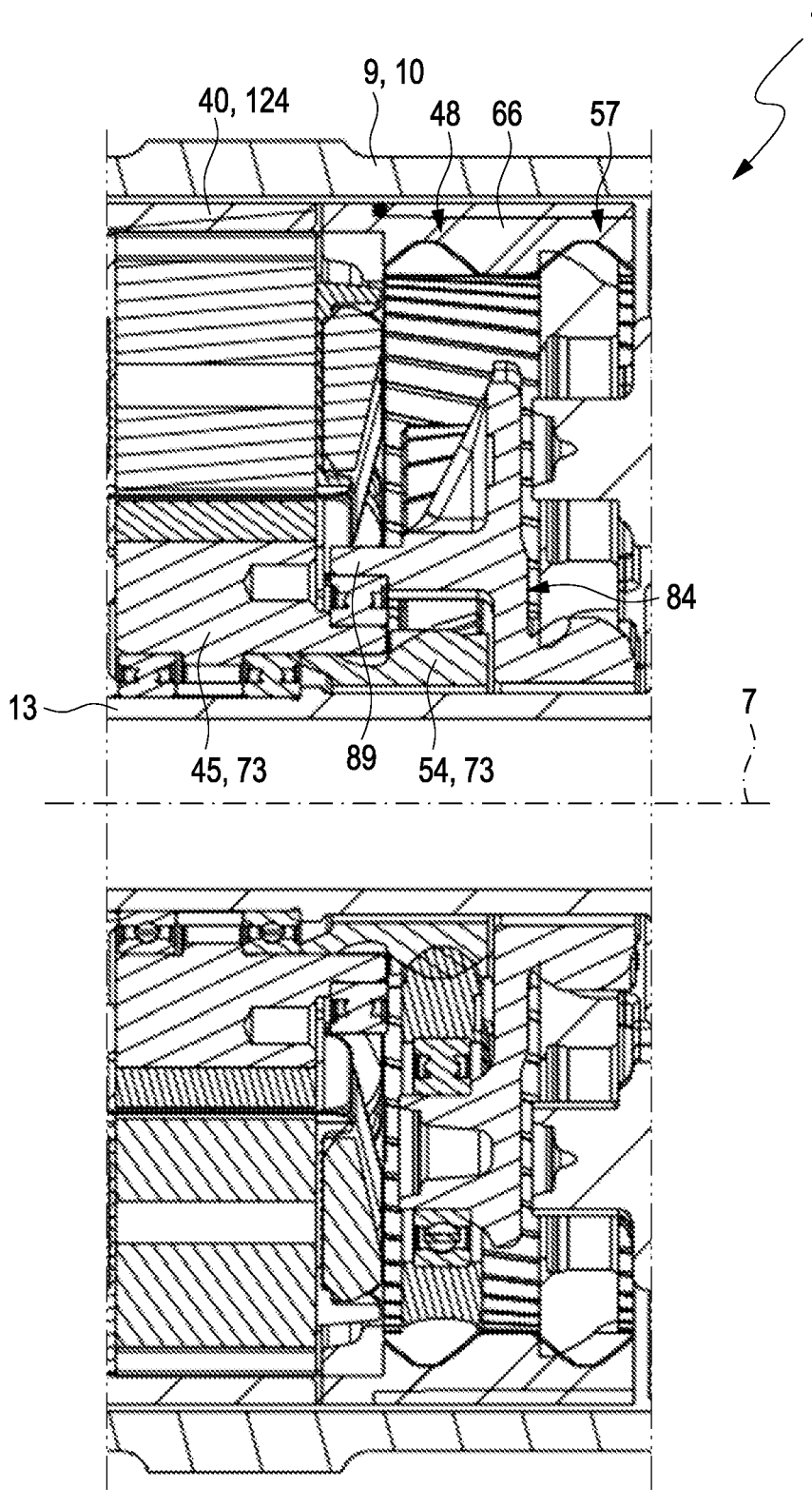

In FIG. 14, a further embodiment of the wheel hub drive 1 is shown in a longitudinal section. In contrast with the embodiment of the wheel hub drive 1 described above, the sun gear 54 of the first planetary gear 48 and the drive hollow shaft 45 of the electric motor device 35 are not embodied integrally here but as separate components, which are positively joined to one another for example by way of pressing. The sun gear 54 and the drive hollow shaft 45 therefore form a multi-part yet integral sun gear-drive hollow shaft unit 73. Furthermore, the embodiment of the wheel hub drive 1 according to FIG. 14 differs from the preceding embodiment in that in the assembled state of the wheel hub drive 1 the axial bearing arms 89 of the planet carrier ring-sun gear assembly 84 are no longer axially and/or radially supported on the stator ring 40 of the electric motor device 35 or on the stator carrier 42 of the stator ring 40, but now on the drive hollow shaft 45 of the electric motor device 35 and because of the fact that the stator ring 40 is produced by a cylinder ring body 124 out of a metal material, in particular out of an aluminium material or a steel material, a plastic material or a composite material.

Figure 15:
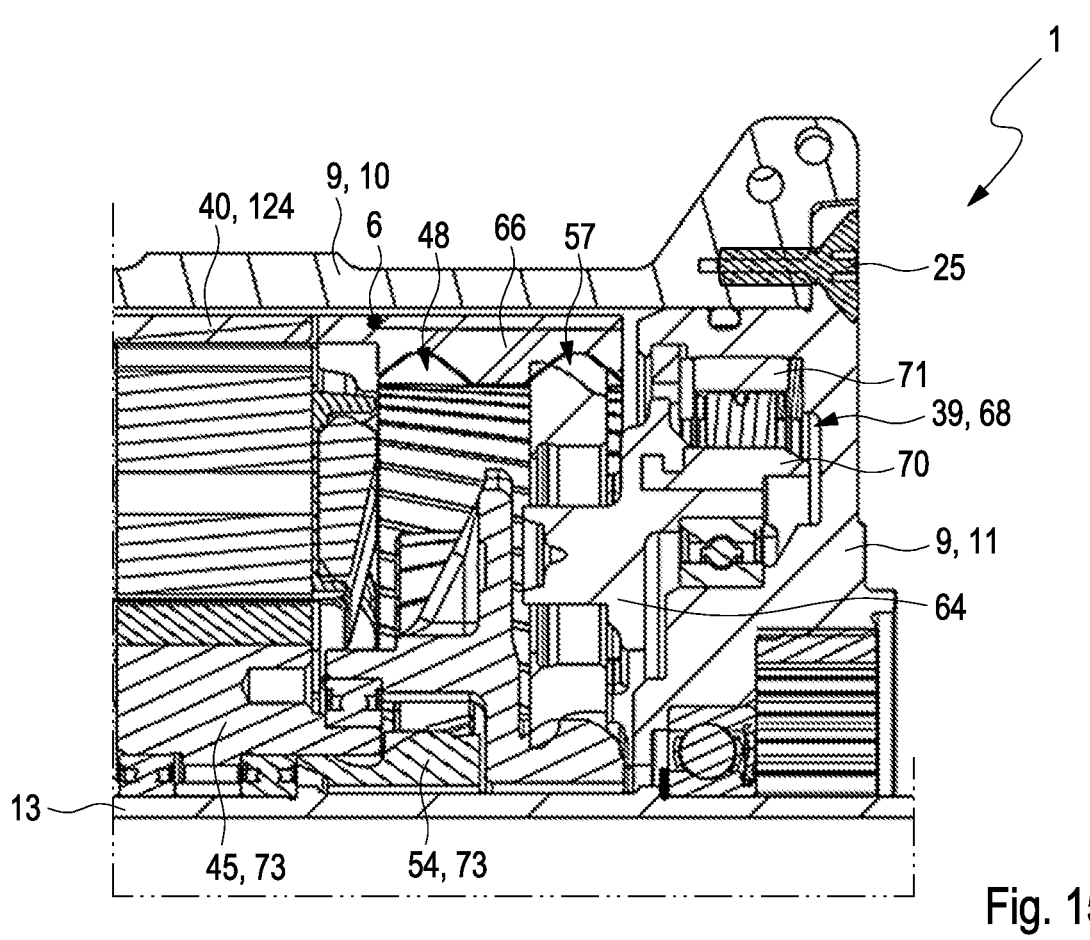

FIG. 15 shows a further embodiment of the wheel hub drive 1 in a longitudinal section. In contrast with the embodiments of the wheel hub drive 1 described above, the planet carrier ring freewheel unit 90 is realised here in that the said planet carrier ring 64 instead of on the said freewheel outer ring 71, is positively arranged on the freewheel inner ring 70 of the freewheel device 68, in particular moulded on. Further, the freewheel device 68 instead of by way of its freewheel inner ring 70 is supported on the housing cover 11 via its freewheel outer ring 71. The stator ring 40 is likewise formed by a cylinder ring body 124 which is produced out of a metal material, in particular out of an aluminium material or a steel material, a plastic material or a composite material. A locking ring is indicated with reference number 6.

Figure 16:
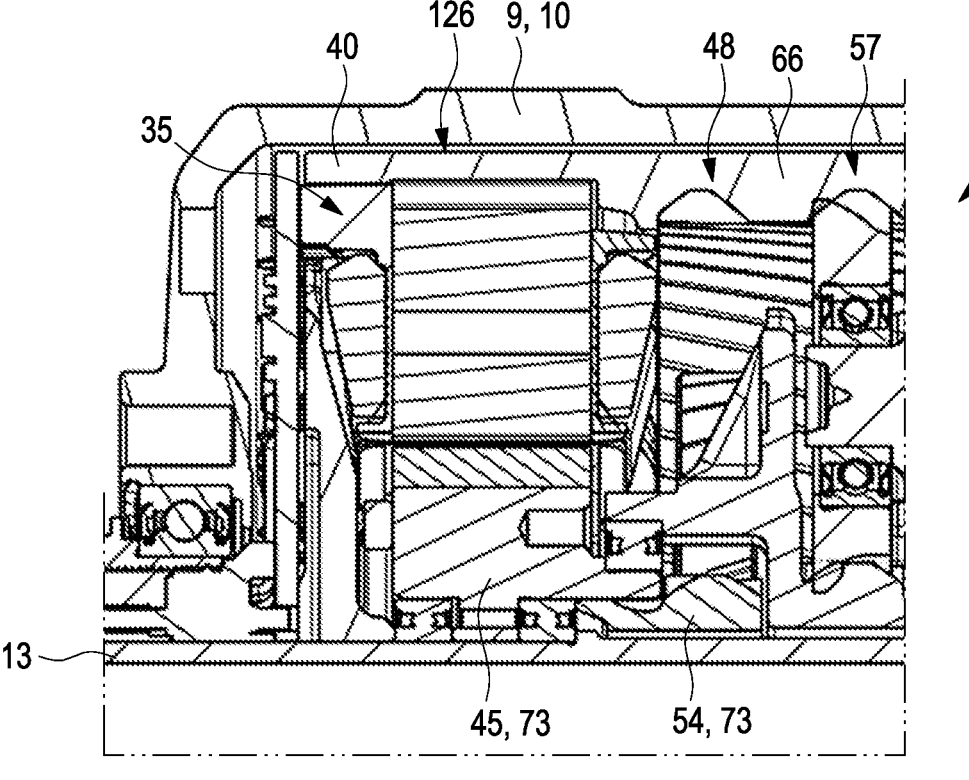
Figure 17:
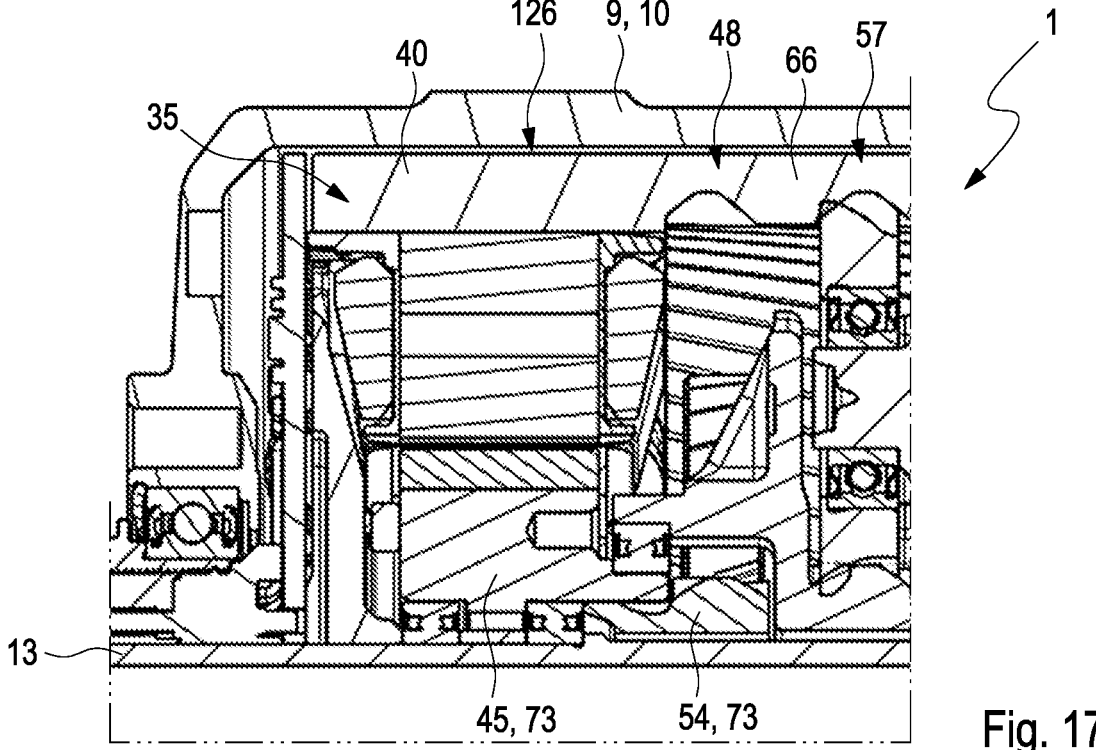

In FIGS. 16 and 17, further embodiments of the wheel hub drive 1 are shown in a longitudinal section. In contrast with the previously described embodiments of the wheel hub drive 1 it is provided here that the said stator ring 40 and the said internal gear 66 form a unit 126, in that the stator ring 40 is axially extended so that the internal gear 66 can be directly mounted, for example it can be pushed in or integrally moulded. The unit 126 can also be embodied as a monolithic unit 126 in that the said stator ring 40 and the said internal gear 66 are realised integrally. Practically, the monolithic unit 126 can be produced out of a plastic material.

The invention claimed is:

1. A stator ring-internal gear assembly for a transmission device comprising a planetary gear of a wheel hub drive for a vehicle, the assembly comprising:
   a stator ring of an electrically operable electric motor device of the wheel hub drive for providing a motor torque;
   an internal gear of the transmission device for translating the provided motor torque into a net torque;
   wherein the stator ring and the internal gear are directly fixed to one another by a material-positive connection in a non-rotatable and tension-resistant manner, and
   wherein the internal gear is joined via the material-positive connection to a stator carrier portion of the stator ring located radially outside of the stator ring.

2. The stator ring-internal gear assembly according to claim 1, wherein the internal gear is joined to the stator ring via over-moulding for the material-positive connection.

3. The stator ring-internal gear assembly according to claim 1, wherein the stator ring, on a side facing the internal gear, has a circumferential edge toothing that is over-moulded by the internal gear.

4. The stator ring-internal gear assembly according to claim 3, wherein the edge toothing comprises an undercut which is over-moulded by the internal gear.

5. The stator ring-internal gear assembly according to claim 1, wherein the planetary gear includes at least two planetary gears, and wherein the internal gear is configured to interact with the at least two planetary gears; and
   the internal gear has an internal helical toothing configured to interact with the at least two planetary gears of the transmission device.

6. The stator ring-internal gear assembly according to claim 1, wherein one of:
   the stator ring comprises a stator and a stator carrier;
   the stator carrier is configured in multiple parts and comprises a pot-shaped stator carrier pot and a stator carrier cover; and
   the stator carrier includes a cylinder ring body, the stator is oriented radially to the inside of the body, and the internal gear is secured axially via a locking ring.

7. The stator ring-internal gear assembly according to claim 6, wherein at least one of the stator carrier of the stator ring, the pot-shaped stator carrier pot, the stator carrier cover, and the cylinder ring body are produced out of a metal material; and
   the internal gear is produced out of a plastic material or a composite material.

8. The stator ring-internal gear assembly according to claim 1, wherein the internal gear is joined to an edge region of the stator ring.

9. The stator ring-internal gear assembly according to claim 1, wherein a stator carrier of the stator ring is configured in multiple parts.

10. The stator ring-internal gear assembly according to claim 1, wherein a stator carrier of the stator ring comprises a pot-shaped stator carrier pot and a stator carrier cover.

11. The stator ring-internal gear assembly according to claim 1, wherein a stator carrier of the stator ring includes a cylinder ring body, and a stator of the stator carrier is oriented radially to the inside of the body.

12. The stator ring-internal gear assembly according to claim 1, wherein the internal gear is secured axially via a locking ring.

13. The stator ring-internal gear assembly according to claim 1, wherein a stator carrier of the stator ring comprises a metal material.

14. The stator ring-internal gear assembly according to claim 1, wherein the internal gear is comprises a plastic material or a composite material.

15. A wheel hub drive of a vehicle, comprising:
   a hub housing composed of a pot-shaped monolithic housing pot and a monolithic housing cover that is rotatably adjustably mounted on a central hollow shaft of the wheel hub drive arranged coaxially with respect to a centre axis of the wheel hub drive; and
   a drive unit including (i) an electrically operated electric motor device housed in the hub housing for providing a motor torque, (ii) a transmission device housed in the hub housing for translating the motor torque into a net torque, and (iii) a coupling device housed in the hub housing for transmitting the net torque to the housing cover;
   wherein the drive unit further including at least one stator ring-internal gear assembly, the at least one stator ring-internal gear assembly including:
   a stator ring of the electrically operated electric motor device for providing a motor torque;
   an internal gear of the transmission device for translating the motor torque into a net torque;
   wherein the stator ring and the internal gear are directly fixed to one another in a non-rotatable and tension-resistant manner via a material-positive connection, and
   wherein the internal gear is joined via the material-positive connection to a stator carrier portion of the stator ring located radially outside of the stator ring.

16. The wheel hub drive according to claim 15, wherein the electric motor device, the transmission device, and the coupling device are arranged coaxially with respect to the centre axis; or
   the electric motor device, the transmission device, and the coupling device are arranged axially in series with respect to the centre axis.

17. The wheel hub drive according to claim 15, wherein the internal gear is joined to the stator ring via over-moulding for the material-positive connection.

18. A vehicle operated by wheel hub drive and muscle power, the vehicle comprising:
   at least one wheel hub drive installed in a region of a wheel hub of a wheel of the vehicle, the at least one hub drive including:
   a hub housing composed of a pot-shaped monolithic housing pot and a monolithic housing cover that is rotatably adjustably mounted on a central hollow shaft of the wheel hub drive arranged coaxially with respect to a centre axis of the wheel hub drive; and
   a drive unit including (i) an electrically operated electric motor device housed in the hub housing for providing a motor torque, (ii) a transmission device housed in the hub housing for translating the motor torque into a net torque, and (iii) a coupling device housed in the hub housing for transmitting the net torque to the housing cover;
   wherein the drive unit further including at least one stator ring-internal gear assembly, the at least one stator ring-internal gear assembly including:

a stator ring of the electrically operated electric motor device for providing a motor torque;

an internal gear of the transmission device for translating the motor torque into a net torque;

wherein the stator ring and the internal gear are directly fixed to one another in a non-rotatable and tension-resistant manner via a material-positive connection;

a muscle power-operated pedal device interacting with the at least one wheel hub drive via a transmission gear; and wherein the internal gear is joined via the material-positive connection to a stator carrier portion of the stator ring located radially outside of the stator ring.

19. The vehicle of claim 18, wherein the internal gear is joined to the stator ring via over-moulding for the material-positive connection.

\* \* \* \* \*